(12) United States Patent
Olds et al.

(10) Patent No.: US 7,150,549 B2
(45) Date of Patent: Dec. 19, 2006

(54) WHEEL ROTATIONAL SPEED CONTROLLED VEHICLE ILLUMINATION SYSTEM

(76) Inventors: Roger Olds, 1507 E. 53rd St., No. 515, Chicago, IL (US) 60615; Marquis Burnett, 2349 Bellview, #C, Topeka, KS (US) 66605; Jason Ng, 7637 N. Rogers St., #2W, Chicago, IL (US) 60626

( * ) Notice: Subject to any disclaimer, the term of this patent is extended or adjusted under 35 U.S.C. 154(b) by 122 days.

(21) Appl. No.: 10/699,723

(22) Filed: Nov. 3, 2003

(65) Prior Publication Data

US 2004/0130905 A1 Jul. 8, 2004

Related U.S. Application Data

(63) Continuation-in-part of application No. 10/234,877, filed on Sep. 4, 2002, now Pat. No. 6,641,041.

(60) Provisional application No. 60/356,075, filed on Feb. 11, 2002, provisional application No. 60/317,068, filed on Sep. 4, 2001.

(51) Int. Cl.
*B60Q 1/32* (2006.01)

(52) U.S. Cl. .................. 362/500; 362/464; 362/802; 40/587

(58) Field of Classification Search ............... 362/500, 362/464, 802; 40/587
See application file for complete search history.

(56) References Cited

U.S. PATENT DOCUMENTS

| | | | |
|---|---|---|---|
| 3,449,201 A | | 6/1969 | Palmquist et al. |
| 4,289,376 A | | 9/1981 | Vukadinovic |
| 4,318,436 A | | 3/1982 | Shurman |
| 4,381,537 A | * | 4/1983 | Hinrichs ............... 362/500 |
| 4,562,516 A | * | 12/1985 | Chastain ............... 362/500 |
| 4,655,546 A | | 4/1987 | Nagasaka et al. |
| 4,775,919 A | * | 10/1988 | Pearsall et al. ......... 362/500 |
| 5,016,144 A | * | 5/1991 | DiMaggio ............. 362/500 |
| 5,313,187 A | | 5/1994 | Choi et al. |
| 5,392,200 A | * | 2/1995 | Milde ................... 362/500 |
| 5,548,274 A | | 8/1996 | Anderson et al. |
| 5,683,164 A | * | 11/1997 | Chien ................... 362/500 |
| 6,322,237 B1 | * | 11/2001 | Lee ...................... 362/500 |
| 6,789,928 B1 | * | 9/2004 | Khan .................... 362/500 |
| 2004/0218397 A1 | * | 11/2004 | Luo ...................... 362/500 |

* cited by examiner

*Primary Examiner*—Thomas M. Sember
*Assistant Examiner*—Ismael Negron
(74) *Attorney, Agent, or Firm*—Connolly Bove Lodge & Hutz LLP

(57) ABSTRACT

An illumination system has a housing that rotates with a vehicle wheel, and the housing has a cavity with lighting and controls within the cavity. Light from the cavity is directed onto a vehicle wheel, and the light flashes in relationship to the rotation speed of the wheel which makes the wheel appear to be stationary or slowly rotate in a backward or forward direction.

17 Claims, 7 Drawing Sheets

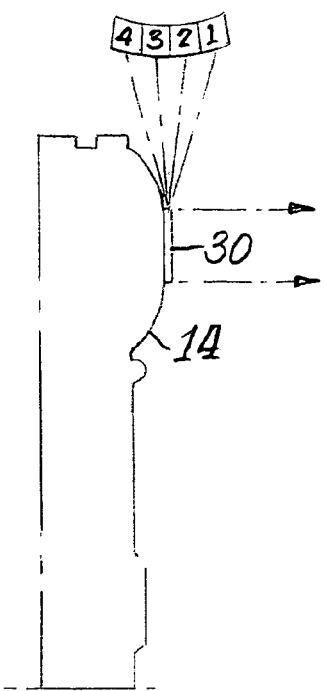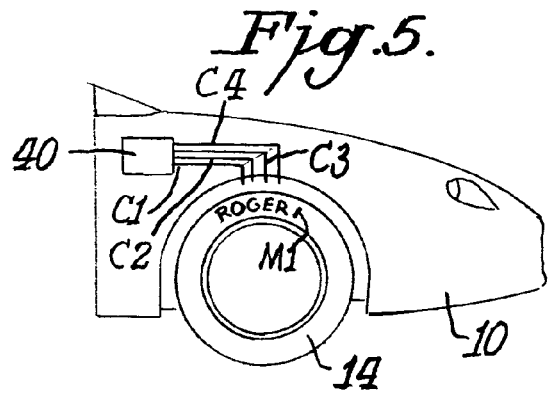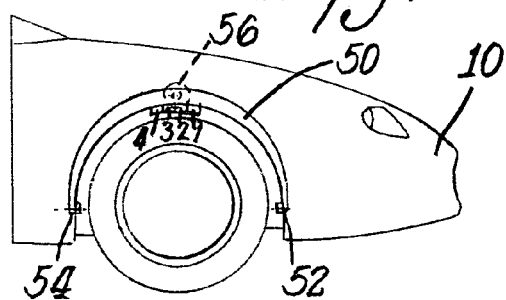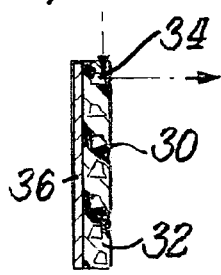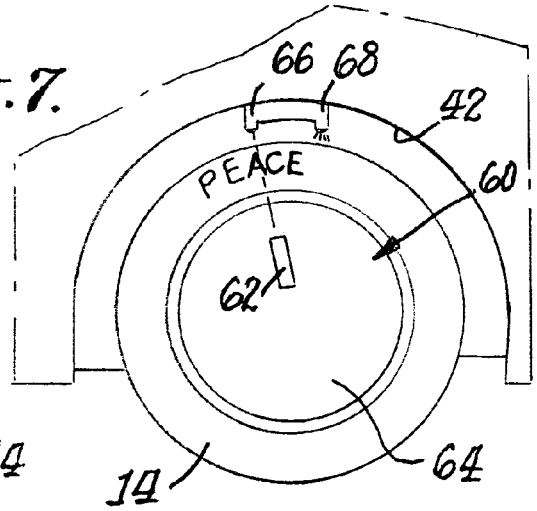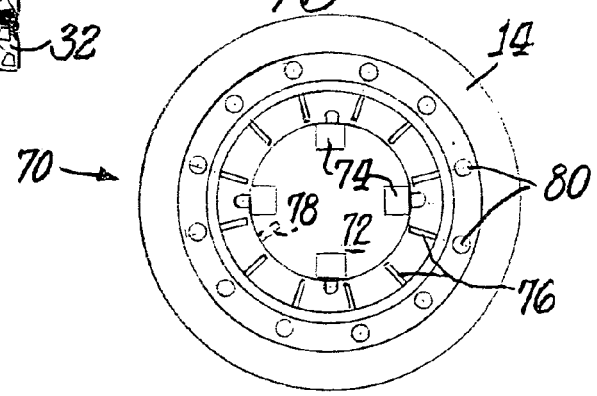

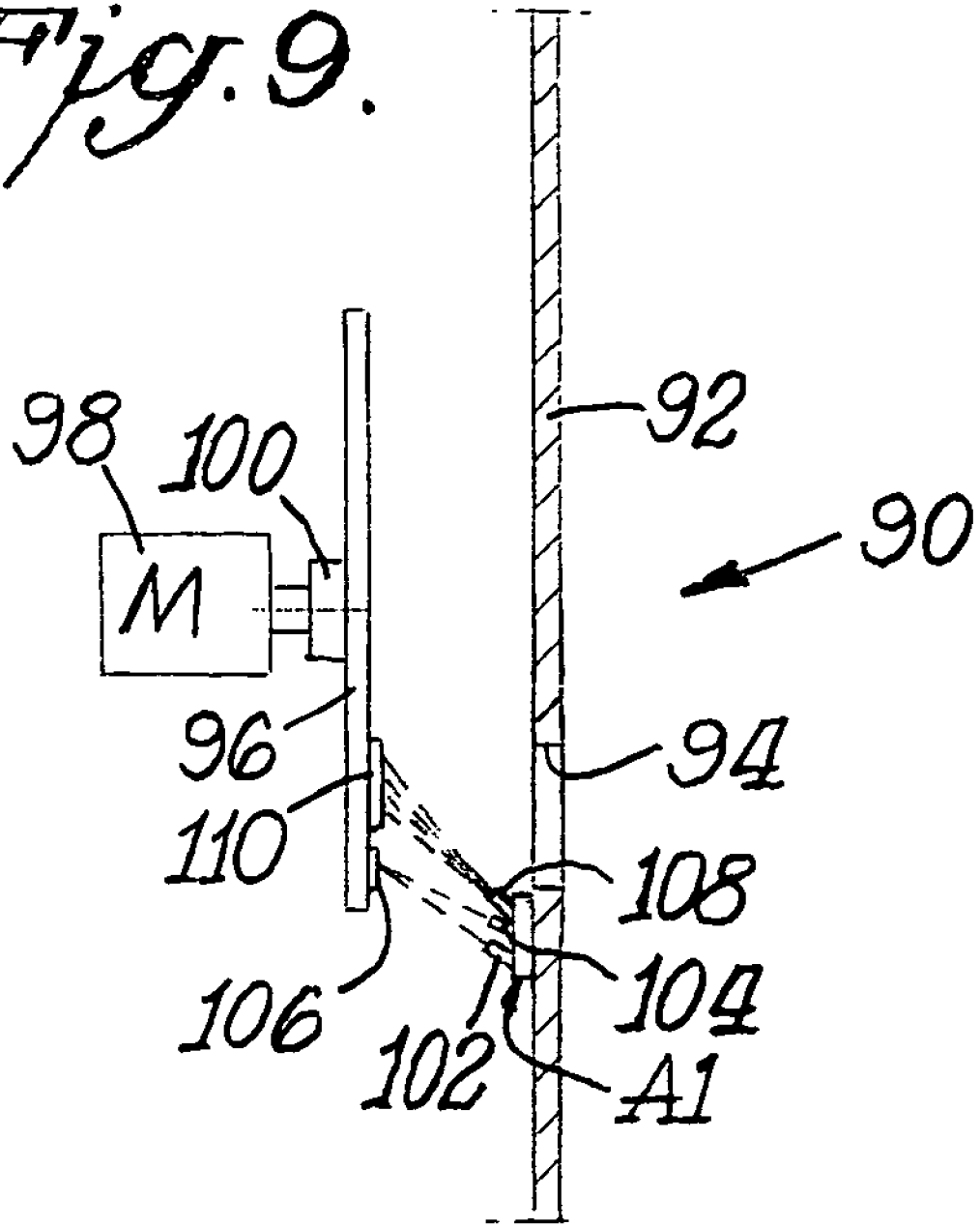

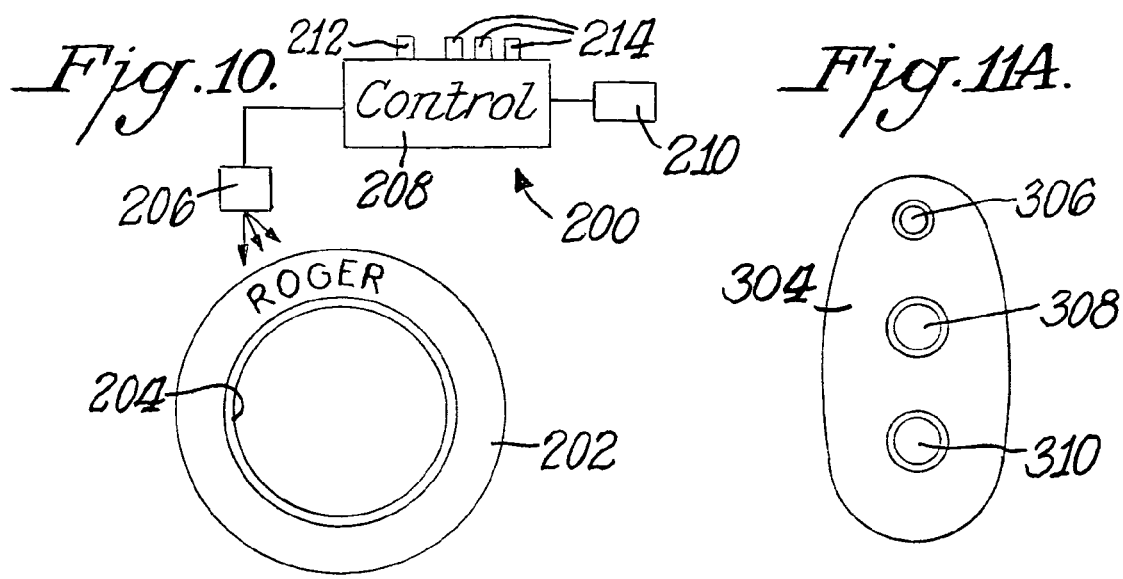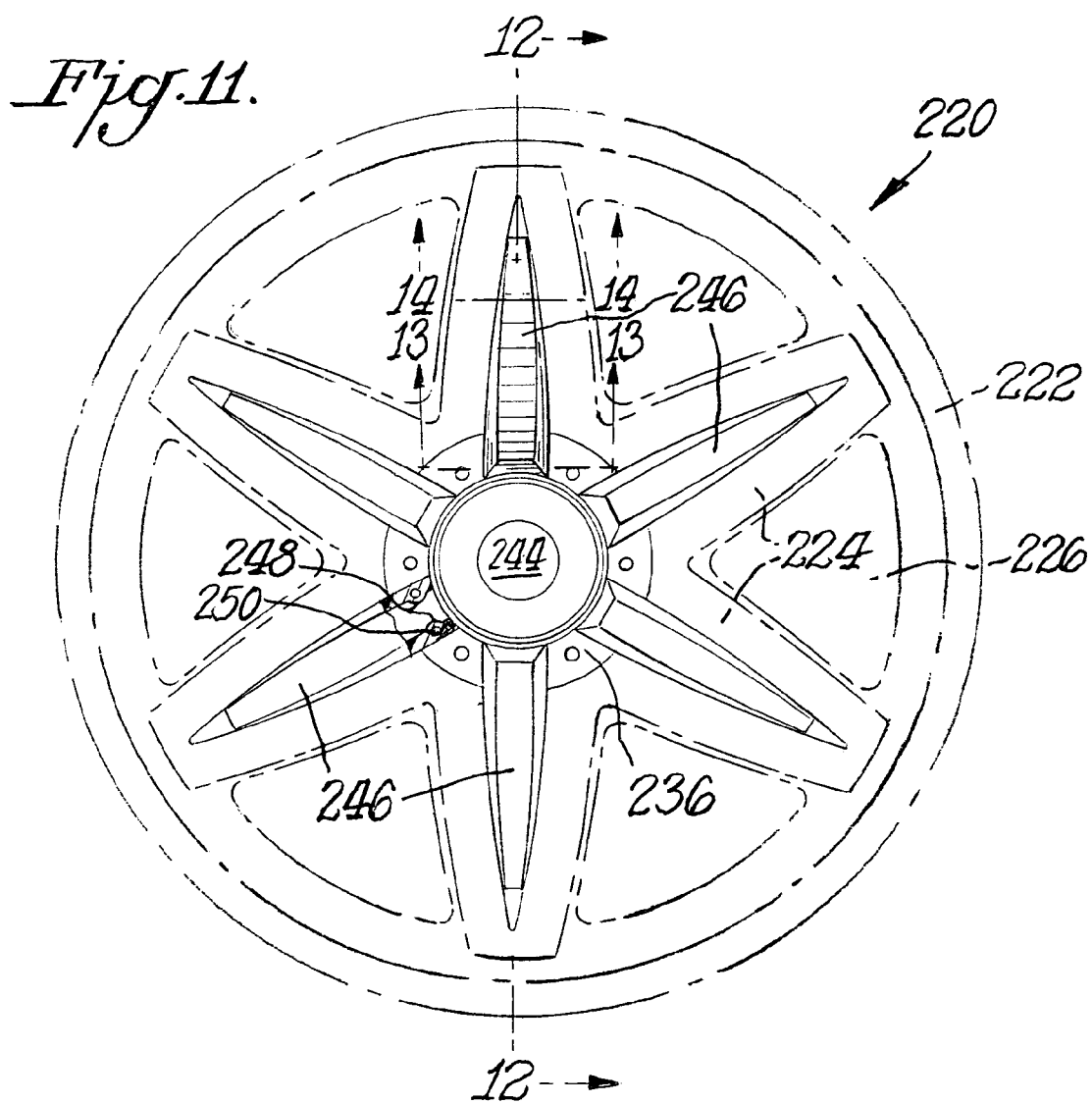

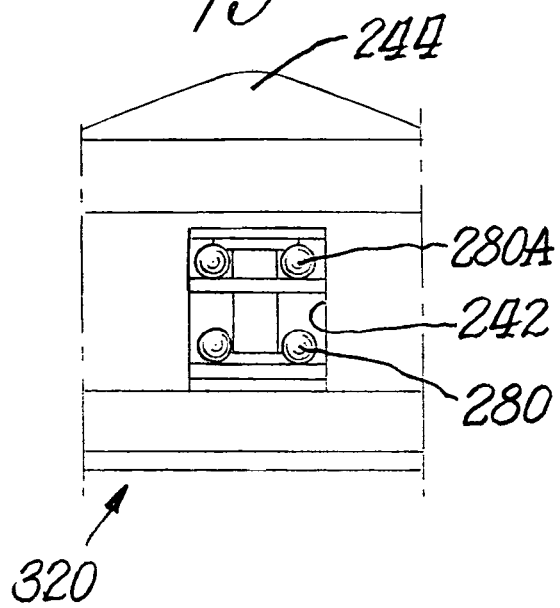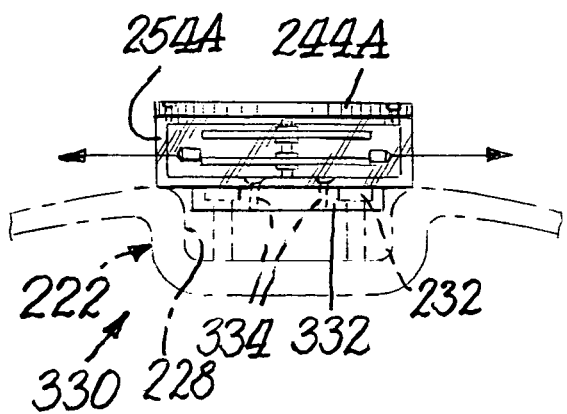

WHEEL ROTATIONAL SPEED CONTROLLED VEHICLE ILLUMINATION SYSTEM

REFERENCE TO RELATED APPLICATIONS

The present application claims the benefit of provisional applications Ser. Nos. 60/317,068, filed Sep. 4, 2001, and 60/356,075, filed Feb. 11, 2002, and these applications are incorporated herein by reference for any and all useful purposes. Also, this application is a continuation-in-part of application Ser. No. 10/234,877, filed Sep. 4, 2002, now U.S. Pat. No. 6,641,041, which claims the benefit of the above identified provisional applications.

BACKGROUND OF THE INVENTION

This present invention relates to a logic-controlled light with an emitter and sensor which identify and shine a burst of light or radiation onto a rapidly moving or rotating or vibrating or repeating element, and an illuminating system or wheel containing the logic-controlled light. The lighting system illuminates the tire and/or wheel areas of a vehicle. In particular, the illuminating system may be used to make the wheel area, spokes and/or lugs selectively appear to be stopped and/or animated as they rotate when driving the vehicle. Also, customized information on the side of the tire can be communicated in a predetermined manner as the tire rotates.

The use of vehicles for displaying messages and advertising products for sale has existed for some time. The large number of vehicles and their exposure to the public provide an excellent source for such messages and advertising. The message can be displayed in any convenient location on the vehicle such as bumpers and the like. Persons have the option of purchasing a variety of messages printed on a plastic sheet with an adhesive back to attach the sheet to bumpers. Signs are also available with magnets to temporarily attach the sign to a side door of the vehicle. Stickers on the windows of vehicles are also used to provide identification and to display various types of information. Essentially every convenient vehicle location is used in some way for written information as well as for graphical displays. Signs may also be added to the top of the vehicle which are illuminated to display a message on the sign, particularly at night.

Some locations are more convenient than others depending on the type of information and the movement of the vehicle. For example, the side of a tire is used for messages for the slow moving or stationary vehicle. Normally tires have a black tread and sidewall and many tires have white letters displayed on their sidewalls to advertise the tire manufacturer. The demand for raised white letters on the sidewall of the tire has become greater as owners have become more interested in making a statement by displaying information on the side of their tires. In U.S. Pat. No. 4,318,436 molded rubber articles are disclosed for use on tire sidewalls to provide a combination of decorative, multi-colored, personalized, safety-enhancing and utilitarian type information. The rubber articles provide limitless styling for the vehicle which is stopped or near stopped. However, this location is not desirable for the traveling vehicle due to high speed tire rotation.

The sidewall of a tire can be used to display written and graphical indicia if the tire can be made to appear stationary while the vehicle is moving. Stroboscopic instruments are common in the industry for making moving bodies intermittently visible by illuminating a part of the body with bright flashes of light. Short flashes of very bright light can make a portion of an object appear stationary, if the frequency of the flashes is synchronized to the movement of the object. However, stroboscopes in the industry are normally used for inspections of rotating machinery and are usually hand carried or tripod mounted. Stroboscopes in the art are not designed for displaying information on the side of a rotating tire or making a wheel assembly appear stationary or animated.

In today's society the purchase of an automobile is often the second largest purchase made during an individual's lifetime. As such, the automobile is the outward manifestation of most individual's self-esteem, social progress and identity. Most late model automobiles have some label, vanity tag, emblem, detailing, or signature to make the mass-produced vehicle unique. The current emphasis is on automobile rims or wheels. One wheel continues to spin when the vehicle stops and the overall cost is quite high. Similar effects to those accomplished mechanically with such wheel spinners may be accomplished with creative lighting.

General lighting of vehicles and the area around a vehicle for aesthetic effects, and to attract the attention of others to an operator's vehicle, has become something that has considerable economic value in the industry. People like to show off their vehicles.

Reflection of light from an automobile tire is disclosed in U.S. Pat. No. 4,289,376. This patent discloses using an adjustable light reflector attached to the valve of the tire. The light protrudes just outside the outermost edge of the tire's sidewall so as to reflect light once each rotation of the wheel creating a flickering effect. The reflector is illuminated by the lights of other vehicles and information is not displayed on the reflector.

Also, U.S. Pat. No. 5,548,274 discloses a stroboscopic device for displaying indicia, including written and graphical information, on the side of a tire as the vehicle is moving. In particular, the indicia is made to appear stationary as the tire rotates by illuminating the tire with bright flashes of light.

SUMMARY OF THE INVENTION

The tires of the automobile often carry labels and identifying marks, but these marks promote the tire companies and their products, not the individual. The system of the present invention allows the individual to place the individual's mark, name, slogan, etc. on the exterior of a tire by application of pliable or non-pliable materials, paint, or surface preparation that can be seen by individuals in close proximity to the tire. Further, this system allows for better viewing of any mark, name, slogan or drawing on the tire and the design of the wheel, especially when the tire and automobile are in motion. The system in one form comprises a series of rubber letters/numbers applied to the exterior perimeter of the tire using rubber adhesive and/or heat. A light and sensor are positioned in each wheel well of the automobile and collectively they function to locate and tire whenever the letters/numbers are positioned on the top of the tire sidewall or any other desired location on the tire. This process not only illuminates the letters/numbers, but it also may stop the wheel so that the name and the beauty of the wheel and tire are clearly visible constantly while the automobile is moving down the street at normal speeds.

Among the other objects and features of the present invention is the application of letters, numbers, symbols and/or pictures fashioned out of rubber sheet-stock to the exterior of tire sidewalls and white sidewalls using rubber adhesive and/or other suitable chemicals with or without the presence of heat and pressure. The indicia applied to the tires may be folded, crimped or rolled letters, number, symbols, and/or pictures fashioned out of rubber sheet-stock or other suitable elastomeric or plastic material so that the letters, numbers, symbols, and/or pictures are not readily visible until the tires/wheels obtain sufficient revolutions per minute to unfold, uncrimp and/or unroll the letters, numbers, symbols, and/or pictures for illumination and viewing by natural light, electric illumination, or strobe light(s).

The invention also includes the processing of the automobile tire sidewall to expose the white rubber underlayer in the form of letters, numbers, symbols, and/or pictures for viewing and/or illumination by natural light, artificial (electric) illumination, or strobe light. Also, paint, solvent, and/or adhesive material and non-pliable materials may be applied to the automobile tire sidewall to form letters, numbers, symbols and/or pictures for viewing in natural light, artificial (electric) light, and/or strobe lights.

Illumination of an image on a stationary or rotating tire may include using a laser, bright light, or reflected light or neon light.

A series of hollow letters, numbers, symbols and/or pictures may be used that fill with a contrasting liquid or semi-solid, or colloidal suspension when the forces from the rotating tire force the mobile phase into the hollow space(s) from a reservoir.

A flashing light assembly that is self-contained and provides a bright light to illuminate the tire and wheel assembly may be utilized. Such self-contained assembly may include a battery for energizing the individual components. This causes the tire and wheel assembly to appear to remain stationary to the viewer when the automobile is traveling at a normal speed as well as when the automobile is stationary.

The flashing light assembly may contain a sensor and may be self-contained. When reflected light or directed light or radiation hits the sensor, the self contained unit energizes a bright light to illuminate the tire and wheel assembly. This causes the tire and wheel assembly to appear to remain stationary to the viewer when the automobile is traveling at all normal speeds and the tire/wheel assembly is in a specific or several specific orientations as determined by the sensor.

Moreover, the flashing light assembly may be energized by the automobile battery for operation.

The flashing light assembly may contain a computer or logic circuit that provides control to eliminate illumination when the automobile is moving too slowly or stationary or causes variable and differing illumination of the tire/wheel assembly as determined by the driver.

A flashing light assembly of one or more lights may operate from a central location in the automobile to convey pulse light(s) to the four tire wells, tires and wheels. A series of glass fiber optic cables, plastic fiber optic cables and combination of glass and plastic fiber optic cables and a series of reflectors and/or magnifiers and/or fiber optic union boxes sense the orientation of each tire and emit and convey bursts of light.

The flashing light or LED assembly may also be triggered to emit light by non-optical determination of the orientation of the tire/wheel assembly.

An intense light may perform through the use of deflectors or blinders that cause bursts of illumination to the tires and wheel assemblies and wheel wells similar in magnitude, duration and frequency to a strobe light or neon tube assembly.

A radiation source and radiation acceptor for the source may be located in a wheel well and on the tire/wheel assembly, respectively or vice verse respectively so that an identifying series of letters, numbers, symbols, and/or pictures can be viewed.

The light source may be any visible or invisible radiating energy.

A mechanical device may be utilized to cause the irradiation device to be hidden or almost hidden from sight when not operational, but then cause the radiation emitting source to radiate the side wall of the tire and/or the wheel assembly effectively and efficiently. A prismatic device may also be used for this purpose.

In an alternative embodiment an electrically driven illumination system may be used that switches off and on when a contact correlated to wheel rotation switches off and on. Still another embodiment may include an electric sign attached to the tire/wheel that turns on and off with intermittent current during tire/wheel rotation Moreover, a tire valve stem system may double as a flashing light source to illuminate all or a portion of the tire or wheel assembly at specific times and orientations of the tire and/or wheel assembly. The tire valve system may also double as a sensor for controlling intermittent light to illuminate the tire and/or wheel assembly.

The light system's micro computer and sensors may read varying and different marks and stops, various words, letters numbers, symbols, pictures, etc. in a specified or variable sequence for a variable length of time.

Adhering letters may be cut out of 2 ply bicycle tire patch material (2 ply rubber) and applied to the tire sidewall with rubber adhesive with or without heat. The letters/numbers/symbols may illuminate on their faces when irradiated with light or energy onto their edges. Moreover, the letters/numbers/symbols may be arranged in a circular pattern in reverse on clear release paper/plastic to facilitate uniform spacing and orientation on a circular tire during application.

Moreover, a hubcap or wheel covering or wheel assembly may contain a bright light or strobe that is actuated externally or has an internal switch that causes it to light precisely on every revolution or fraction of a revolution equal to one (1) divided by the number of repeating units of the wheel or hubcap of the wheel, hubcap, wheelcover or other like device to render the appearance of the hubcap, wheelcover or device stationary to a passing observer.

The same apparatus may cause the wheelcover or hubcap to appear to be moving in slow motion or animated when viewed externally.

A wheel with an enclosed light may also function in this manner. Also, a reflection device may function when irradiated as the enclosed light. Also, a mechanical device may cause an enclosed light to appear and irradiate a wheel and/or tire and then retract when the wheel is not in motion.

People buy automobile wheels because of how they appear in the showroom and as displayed in magazines and brochures. They then mount the wheels and drive. While driving the aesthetic detail is lost to flutter. The system of the present invention allows the individual to display the aesthetic beauty or at least a key element of the wheel in addition to the flutter. The wheel may appear stationary (reducing or eliminating flutter) while the vehicle is in motion or stationary.

The system in one form comprises a series of colored or transparent light lenses attached to the center cap of a vehicle wheel. A light and sensor are positioned in the wheel cap interior within a transparent lens which is fastened to the cap to hermetically seal the cavity containing electronic components. The lights are suspended inside the cap/lens housing so that they remain relatively fixed or stationary as the cap turns with the wheel. The light and sensor collectively function to locate and fire (light with short bursts) whenever the repeating element of the wheel design moves into the position of the repeating design element adjacent to it. This process not only illuminates the design elements of the wheel, but it may also stop the wheel, or cause the wheel to appear to be in motion when it is not or otherwise accent the wheel while the vehicle is in motion or stationary thereby enhancing the wheel beauty.

Among the other objects and features of the present invention is a remote control and display with the driver and a corresponding rf or other receiver and antenna which is inside the sealed cap housing with the logic-controlled light. Overall, the arrangement is used to alter the logic. The remote and receiver respectively contain standard transmitter and receiver printed circuit boards for communication. The cap housing contains a power supply system and micro-processor to accept and execute software that controls illuminators such as LEDs or other irradiation elements thereby causing the illuminators to light or irradiate at appropriate times and durations with the aid of diodes and resistors and other standard electronic elements.

Illumination of a lens or wheel or wheel lug bolt, etc. on a stationary or rotating tire may include using a laser, bright light, vapor or gas light, LED or reflected light or neon light.

The light may reach areas of the wheel by means of a series of holes or reflectors or the cap may move out from the wheel mechanically so that the LEDs or lights are exposed to shine back at the wheel or wheel parts.

To make the wheel and/or wheel elements appear to stand still or animate in the daytime, LEDs, lasers, etc. may be positioned in the rotating sections of the wheels along with electronics and power supply. A marker or sensor on a stationary isolated portion of the wheel may be used for determination of wheel speed and position. Also, the system may light the wheel without knowing the wheel speed or position while still producing a pleasant pattern or effect.

A flashing light assembly that is self-contained and provides a bright light/irradiation to illuminate the wheel and tire may be utilized. Such self-contained assembly may include a system of magnets and wire coils to generate power and optionally a small rechargeable battery for energizing the individual components. This causes the wheel and/or tire to appear to remain stationary to the viewer when the vehicle is traveling at a normal speed as well as when the car is stationary.

The flashing light or LED assembly may also be triggered to emit light by non-optical determination of the wheel orientation or speed.

The intense light may perform by constant light from behind the wheel cap with rapid frequency blinders or deflectors that cause short bursts of light to escape to the wheel or wheel parts or the bright light may have its own frequency as with a mercury vapor light and its inherent frequency.

A prismatic device may be used to direct light along lines that are at sharp angles to the direction of the incident beam.

Further, the lights of one embodiment may have separate rows of lights which light independently and are projected to separate discrete portions of the wheel to cause each respective discrete region of the wheel to stop, hesitate, and rotate backwards or forward simultaneously as viewed by a curbside observer when the vehicle is moving forward or backwards or standing still.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 3 is a diagrammatic view of a tire and wheel illustrating predetermined periodic illumination of indicia on the tire utilizing the illumination system of FIGS. 1 and 2;

FIG. 4 is an enlarged sectional view of the indicia on the tire shown in FIG. 3;

FIG. 5 is a diagrammatic view of an alternate embodiment of the present invention wherein the illumination system includes fiber optic cables, according to the present invention;

FIG. 6 is a diagrammatic view of an another embodiment of the present invention which enables portions of the illumination system to be located outside of the vehicle tire when illumination occurs, according to the present invention;

FIG. 7 is a diagrammatic view of an another vehicle tire illuminating system, according to the present invention;

FIG. 8 is a diagrammatic side elevational view of a vehicle tire and still another alternate embodiment of the illuminating system, according to the present invention;

FIG. 9 is a diagrammatic view of a display with an illumination system, according to the present invention;

FIG. 10 is a diagrammatic view of another embodiment of the present invention;

FIG. 11 is a top plan view of a vehicle wheel illumination system, according to the present invention;

FIG. 11A is a top plan view of a control for the system of FIG. 11;

FIG. 18 is a partial side elevational view of another embodiment of the present invention similar to the system of FIGS. 11–17, but having two spaced apart levels of illuminators; and FIG. 19 is a partial side elevational view of still another embodiment of the present invention having a 360° lens without windows.

DETAILED DESCRIPTION OF THE INVENTION

Figure 1:
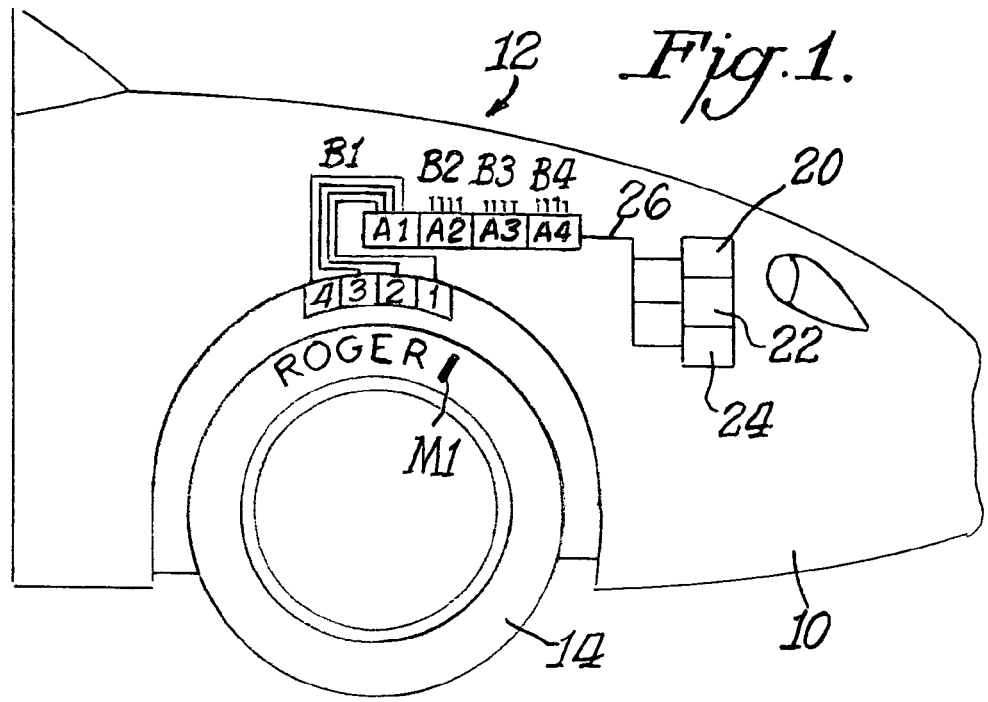
FIG. 1 is a diagrammatic side elevational view of an automobile with a vehicle illumination system, according to the present invention.

Referring in more particularity to the drawings, FIG. 1 shows the front end of an automobile 10 including a vehicle tire illumination system 12, according to the present invention. A microchip logic unit A1 is provided for the vehicle tire 14 illustrated in FIG. 1, it being understood that identical microchip logic units A2, A3 and A4 are also provided, one for each of the other vehicle tires (not shown). Each microchip logic unit includes a circuit board 16 and a hardware base 18. Basically the hardware base includes four components identified in the drawings as 1, 2, 3 and 4, and explained in more detail below. Lines B1, B2, B3 and B4 interconnect units A1, A2, A3 and A4 to the component 1, 2, 3 and 4 associated with each wheel.

Power is supplied to each of the microchip logic units A1, A2, A3 and A4 from a condenser coil 20, power source 22 and backup battery 24. Conducting lines 26 are provided between these components.

Indicia such as the name "Roger" may be applied to the sidewall of the tire 14 by a variety of procedures such as the application of rubberized letters, paint, abrasion of the tire to reveal a white under layment, etc. Additionally, a code in the form of mirror sensor strip M1 or other indicator is appropriately positioned on the sidewall of the tire adjacent the indicia.

The hardware of each microchip logic unit includes component 4 which comprises an infrared or other form of emitter 4 that projects a beam onto the sidewall of the tire 14 or the tread thereof. Component 3 comprises an infrared or other type sensor or detector positioned to receive any light from the emitter 4 which is reflected from the sidewall and/or tread of the tire. Also included in the microchip logic unit is component 3 which comprises a light or strobe or LED flashing unit and component 1 which comprises an optical motion detector. Motion detector 1 merely senses the presence of motion in the field of view of the vehicle tires. If motion is detected and the system is operating the system remains operational. On the other hand, if no motion is detected, the system is shut down.

When the vehicle tire illumination system 12 is energized and the automobile 10 is traveling along a roadway, a beam from emitter 4 is reflected by the mirror sensor strip M1 onto detector 3 each time the sensor strip is in the path of the emitter. When this occurs the microchip logic unit A1 energizes the flashing unit 2 within less than ½ second illuminates the indicia "Roger" on the sidewall of the tire 14 for a duration less than ½ second. This causes the indicia to appear stationary which may then be observed by persons in the field of view of the traveling automobile 10. Each revolution of tire 14 produces a similar burst of bright light from the flashing unit 2 to thereby create the illusion of a stationary tire sidewall in the area of the indicia. As such, the indicia of the sidewall of the tire is easily discernable. The flashing unit 2 may be covered with different color lenses to thereby project colored light onto the sidewall of the tire or onto the wheel.

Normally in the close quarters of an automobile wheel well, the components 1, 2, 3 and 4 are positioned to project the emitter beam and a burst of bright light from almost directly above the side wall of the tire 14. Under such circumstances indicia 30, such as shown in FIGS. 3 and 4 may be fabricated to comprise a matrix of transparent thermoplastic or other material 32 with trapezoidal-shaped, cube-like reflective particles 34 or other non-spherical or spherical particles embedded therein. These particles function to reflect the flashing light outwardly from the automobile tire as well as upwardly toward the sensor 3. The transparent matrix 32 with the reflective particles 34 may be secured to a suitable backer 36 which is applied to the sidewall of the tire 14.

FIG. 5 illustrates an alternate embodiment of the present invention where the microchip logic unit and the associated hardware are packaged within a system 40 located under the body of automobile 10. In system 40, fiber optic cables C1, C2, C3 and C4 are positioned in the wheel well 42 of the vehicle for projection onto the sidewall of tire 14. Fiber optic cable C1 emits infrared light onto the sidewall which is reflected back to fiber optic cable C2 by the mirror sensor strip M1. When this occurs a burst of bright light from fiber optic cable C3 is directed onto the sidewall of the tire to illuminate the indicia "Roger". A burst of such light occurs each revolution of tire 14 which makes the indicia appear to be stationary.

Figure 2:
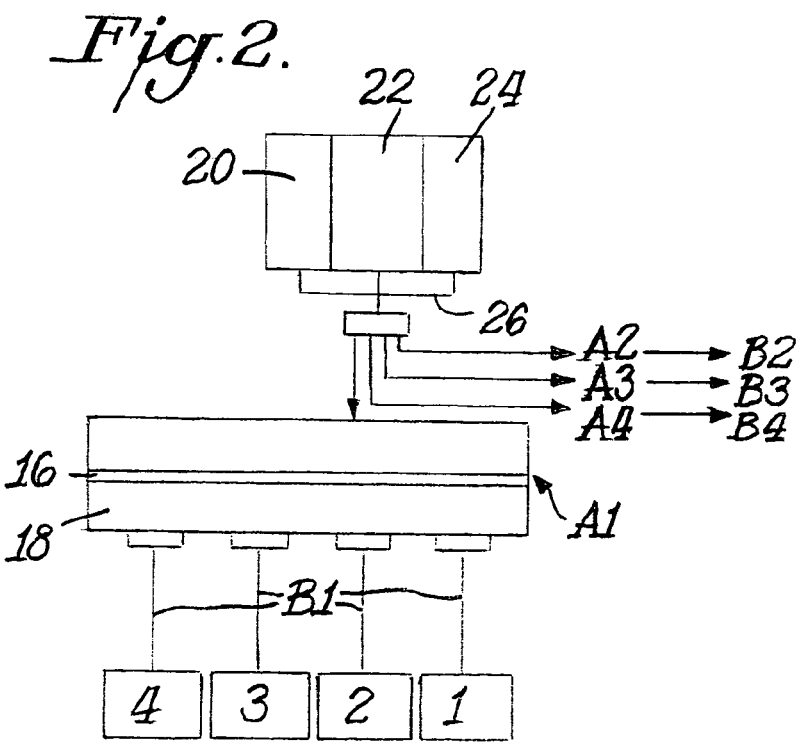
FIG. 2 is a diagrammatic view of portions of the illumination system shown in FIG. 1.
Figure 12:
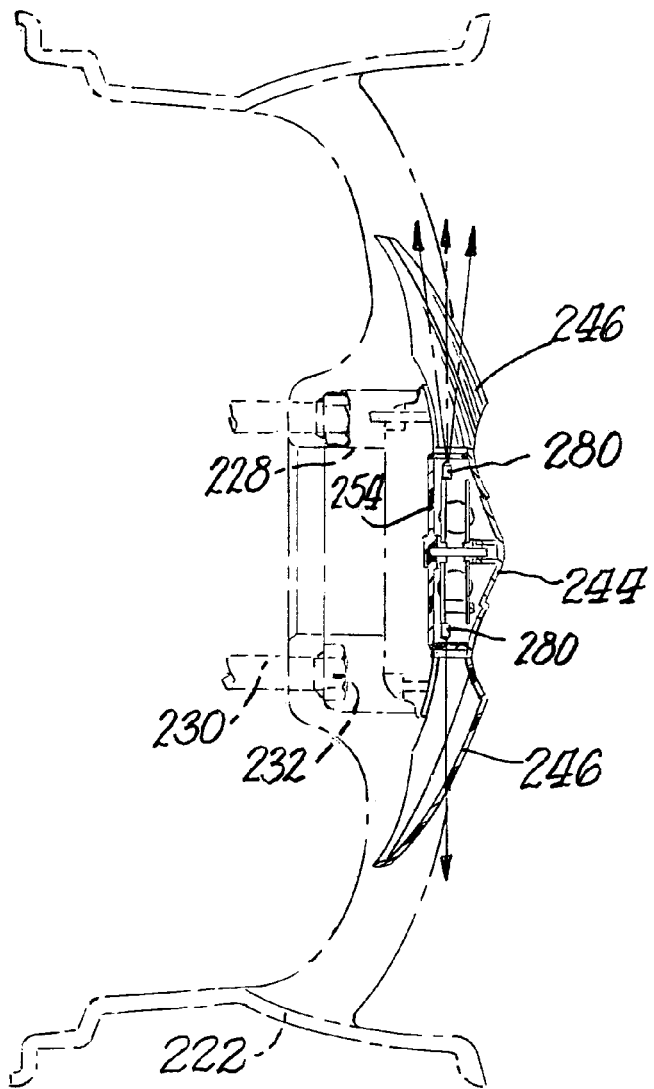
FIG. 12 is a cross-sectional view in elevation taken along line 12—12 of FIG. 11.
Figure 13:
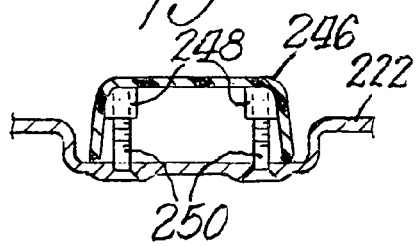
FIG. 13 is a cross-sectional view taken along line 13—13 of FIG. 11.
Figure 14:
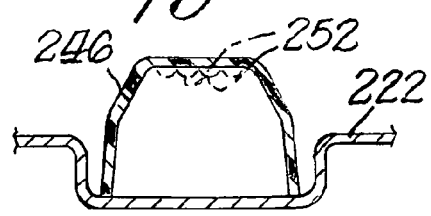
FIG. 14 is a cross-sectional view taken along line 14—14 of FIG. 11.
Figure 15:
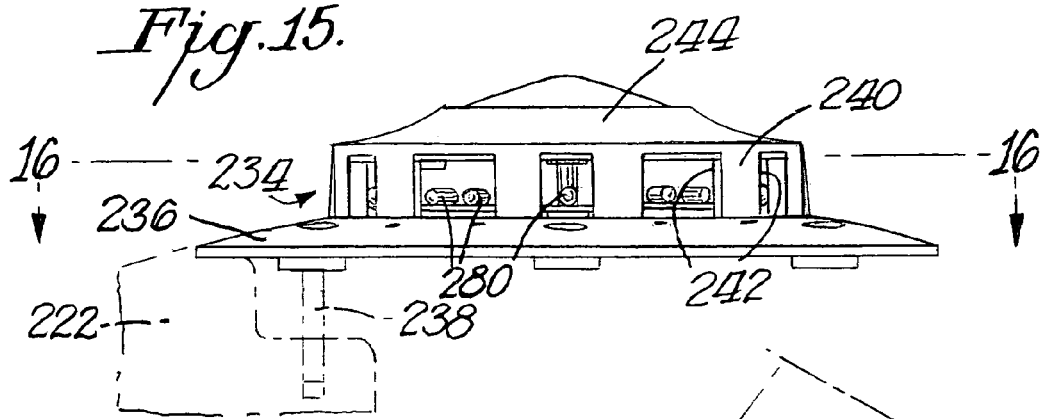
FIG. 15 is a side elevational view of the windowed main housing of the system shown in FIGS. 11–14 having a circumferential mounting flange with electric components inside the housing.
Figure 16:
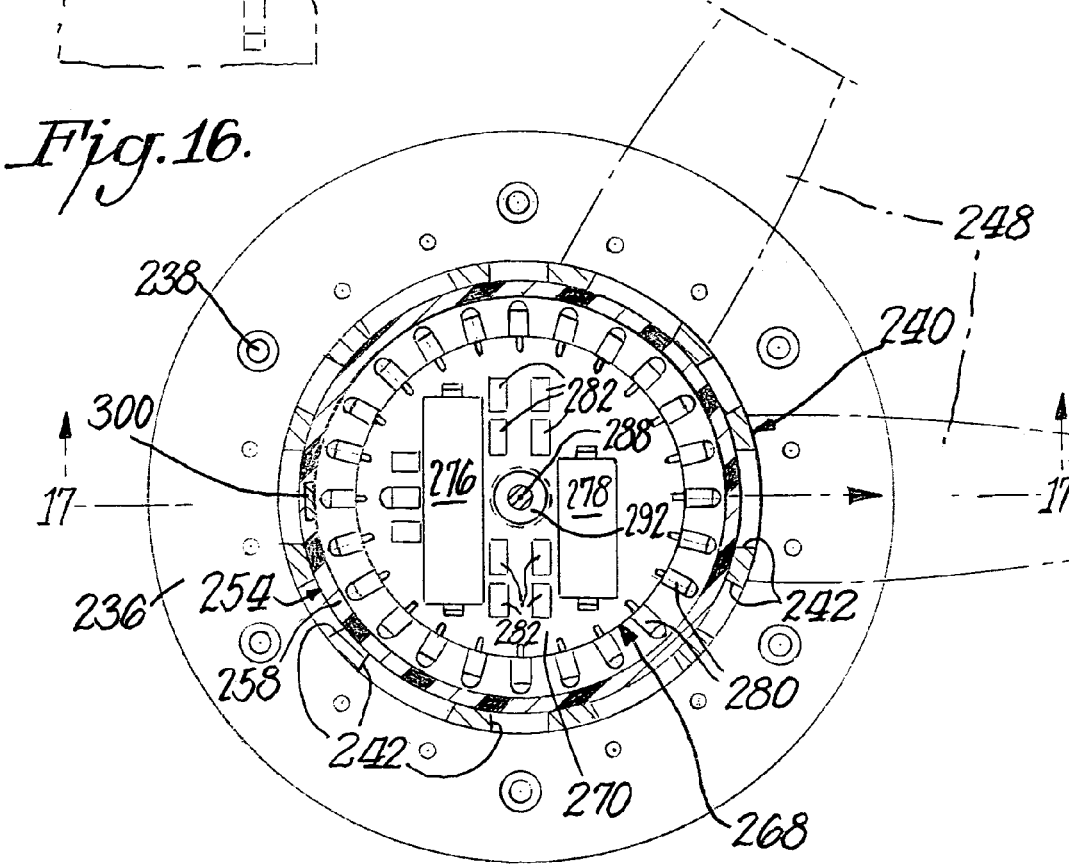
FIG. 16 is a cross-sectional top plan view taken along line 16—16 of FIG. 15.

FIG. 6 shows features of the present invention wherein the components 1, 2, 3 and 4 are positioned on a swing frame 50 pivoted to the automobile 10 by pivot pins 52, 54. Otherwise the system of FIG. 6 is the same as shown in FIGS. 1 and 2. Accordingly, when the system of FIG. 6 is energized a motivator, such as a piston and cylinder 56, function to swing frame 50 in an outward direction about the pivot pins 52, 54. This positions the flashing light unit outwardly of the sidewall of the tire so as to more effectively illuminate the indicia thereon.

FIG. 7 illustrates still another embodiment of the present invention comprising a vehicle tire illumination system 60 that includes an emitter 62 on the wheel 64 of tire 14 that rotates with the wheel. A sensor 66 is positioned in the wheel well 42 of the automobile in the path of any directed light or radiation from emitter 62. During each revolution of the tire the beam from the emitter 62 is directed and received at sensor 66 which then sends a signal to flashing unit 68 to produce a burst of bright light onto the indicia "Peace" on the sidewall of the tire. The indicia is illuminated once for each revolution of the tire thereby producing the effect of the indicia appearing to be stationary.

FIG. 8 illustrates still another vehicle tire illumination system 70 wherein the vehicle wheel includes a stationary hubcap 72 with a plurality of flashing units 74 mounted on the periphery of the hubcap 72. The hubcap can be weighted with suitable connection to the tire wheel so that it does not rotate with the tire wheel. A plurality of sensor switch triggers 76 are positioned on the wheel in a circular array around the stationary hubcap to correspond to each repeating unit of the wheel. Contact arm 78 is positioned inside the hubcap 72 to engage and thereby sense each sensor switch trigger 76 as these triggers rotate past the arm. When such contact occurs each of the flashing units 74 is energized to thereby create a burst of bright light that illuminates the sidewall of the tire and/or wheel. In the embodiment shown in FIG. 8, the wheel includes 12 circular openings 80 and a trigger is associated with each opening. Accordingly, when the contact arm 78 engages a sensor switch trigger 76, each flashing unit 74 creates a burst of light which thereby produces the effect of the wheel with the openings 80 therein appearing to be stationary. Also, the opposite can occur, i.e. the hubcap rotates with the wheel and sensor switch triggers and the isolated contact arm is weighted, contains bearings and remains stationary in relation to the hubcap. The contact arm and sensor switch could communicate by radiation instead of physical contact.

FIG. 9 illustrates a display 90 in the form of a billboard or sign including a stationary wall 92 and an open viewing window 94. The display includes a rotation disc 96 directly behind the stationary wall 92. Disc 96 is connected to a motor 98 by a mounting 100. A microchip logic unit such as A1 positioned behind the stationary wall 92 includes an emitter 102 and a sensor/receiver 104 which detects the presence of light reflected from the disc. In this regard, the disc has a mirror strip 106 thereon which reflects light from the emitter 102 when the mirror strip is within the path of the emitter beam. Upon sensing the reflected emitter beam, the sensor/receiver signals the microchip logic unit A1 to send a burst of bright light of short duration from flashing unit 108 onto the rotating disc, and more particularly onto indicia 110 on the disc thereby displaying the indicia through the window 94. Other areas of indicia (not shown) may be positioned on the disc for rapid display through the viewing window 94. The duration of the burst of light from flashing unit 108 could last as long as the indicia is within view through the window 94, but is usually of shorter duration. Indicia may be arranged on the disc 96 so that a multiword slogan or phrase or an animated sequence appears at the viewing window.

Further the disc may be mostly open space in the form of fan blades such that one can see through the hole unless A1 is activated in which case the billboard hole or an observation hole is opaque with the illuminated fan blade.

Moreover, the motor may be replaced by a vibrator and the disc replaced by a pie-shaped piece directly behind the viewing window. As the pie-shaped piece vibrates, indicia thereon is periodically sensed and illuminated.

FIG. 10 diagrammatically illustrates another wheel and tire illumination system 200 for directing pulses of light onto a tire 202 and/or wheel 204. Fundamentally, system 10 includes a flasher 206 secured to the framework of a vehicle adjacent the tire and wheel. The flasher is connected to a control 208 which in turn is connected to a power source 210 such as the vehicle battery or a separate battery. The control functions to energize the flasher so that it flashes at a predetermined number of flashes per second. By way of example, the control may have three independent settings that cause the flasher to flash at three, seven or eleven flashes per second. In one embodiment of the present invention the control has an off/on switch 212 and three frequency settings 214. Prior to driving the vehicle, the operator manually energizes the control and then selects a frequency depending upon the expected vehicle speed. The flasher then periodically illuminates the tire 202 and/or wheel 204 which produces an animation of the tire and/or wheel as the vehicle is driven. In another embodiment the control may be positioned inside the vehicle for manipulation by the driver. Also, instead of fixed frequency settings, the settings may be variably adjusted.

FIGS. 11–17 illustrate another embodiment of the present invention basically comprising a self contained illumination system 220 that periodically shines pulsed light onto a vehicle wheel 222 such as wheel spokes 224 and areas 226 between the spokes. The wheel has a central cavity 228 and lug bolts 230 extend through the cavity where lug nuts 232 are utilized to secure the wheel to the vehicle.

A main housing assembly 234 is secured to wheel 222 for movement therewith. Assembly 234 includes a circular mounting flange 236 covering the wheel cavity 228 and centrally secured to the wheel 222 by fasteners 238. Housing assembly 234 also includes an annular sidewall 240 with spaced apart windows 242 therein. Twelve windows are shown, one window in alignment with each of the six spokes 224 and one window aligned with each of the six spaces 226 between the spokes. A dome shaped cap 246 is integral with the sidewall 240 and mounting flange 236.

Transparent spoke lenses 246, one for each spoke 224 are secured to mounting flange 236 so that one lens 246 is over each spoke. Mounting plates 248 on each spoke lens 246 are secured to flange 236 by screws 250. The windows 242 associated with the spokes open onto the spoke lenses 246 so that the lenses are illuminated when light passes through the windows, as explained more fully below. Spoke lenses 246 may be clear or colored thermoplastic material with nubs 252 on the inside thereof to diffuse the light.

A cup-shaped transparent lens 254 is mounted within the housing assembly 234. Lens 254 includes a bottom wall 256 and an annular outer wall 258 with an outwardly extending flange 260 at the free end of the outer wall. Flange 260 is secured to the inside of cap 244 by screws 262, and gasket material 264 may be positioned between flange 260 and cap 244 to thereby form a hermetically sealed cavity 266 within the cup-shaped lens. Lens 254 may be clear or colored.

A flasher assembly 268 is mounted within cavity 266, the assembly comprising a pair of spaced apart circular printed circuit boards 270, 272. The boards are spaced apart, but connected together by interconnecting posts 274 as a unit. Batteries 276, 278 are connected to board 270 and outwardly directed LEDs 280 are arranged in spaced apart relationship around the outer periphery of board 270. The LEDs are energized by the batteries and direct light through the windows 242, as explained below. Printed circuit board 270 also includes an array of control modules 282 while board 272 includes an antenna 284 and a receiver 286. Overall these components of the flasher assembly cooperate with one another as a microchip logic unit or microprocessor to perform the various illumination functions described below. The printed circuit boards also include resistors, capacitors, diodes and circuitry which are common in electronics for insuring proper current and voltage across the LEDs 280 for light generation.

Figure 17:
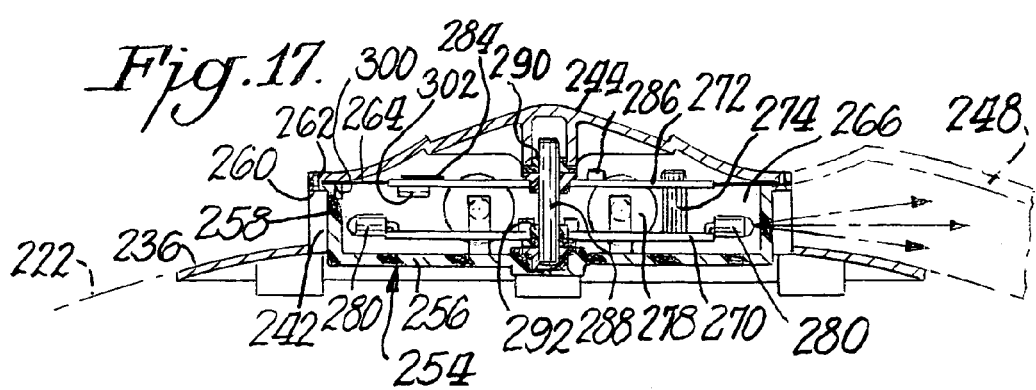
FIG. 17 is a cross-sectional view taken along line 17—17 of FIG. 16.

As shown in FIG. 17 for example, the flasher assembly 268 also includes a shaft 288 to which boards 270, 272 are secured. One end of shaft 288 is journaled to a bearing 290 inside cap 244 of the main housing 234 while the other end of shaft 288 is journalled to a bearing 292 in the bottom wall 256 of cup-shaped lens 254. As in evident, the main housing 234 being connected to the wheel 222 rotates with the wheel when the vehicle is moving. In turn, the cup-shaped lens 254 being connected to inside the cap 244 also rotates with the wheel. However, the flasher assembly 268 does not rotate and remains stationary or relatively so even when the vehicle is moving. The batteries 276, 278 are offset, and the off set weight thereof is sufficient to prevent rotation while enabling the bearings 290, 292 to rotate around the shaft 288.

A magnet 300 is secured to the inside of outer wall 258 of the cup-shaped lens 254 while a magnetic sensor 302 is secured to circuit board 272. These elements function to detect and determine the rotational speed of the wheel as the vehicle is moving. For example, if the magnet 300 passes by the sensor 302 200 times in one minute, the rotational wheel speed is 200 revolutions per minute. As explained, the rotational wheel speed is taken into consideration to achieve a desired wheel animation by flashing the LEDs 280 at desired frequencies. Also, a remote control module 304 is constructed and arranged to communicate with the receiver 286 and antenna 284 on board 272 of the flasher assembly. Control module 304 is shown in FIG. 11A and includes an on/off button 306 as well as buttons 308, 310 for changing the lighting functions of the overall system 220. Fundamentally, the remote control module 304 is accessible to the driver of the vehicle and it transmits radio frequency waves or infrared signals to receiver 286 to energize and deenergize the system as well as to transmit radio frequency waves or infrared signals to the microprocessor components and associated software for purposes of selecting and altering the sequence of the flashing of the LEDs 280 depending upon the desired wheel animation. Remote 304 can also transfer new programs to the sealed infrared receiver and microprocessor from outside the cavity 266.

By way of example there are a number of available programs for lighting the spokes 224 and other areas 226 of the wheel 222. These programs are as follows:

1. LEDs 280 are continuously illuminated or cycle at very high frequencies thereby continuously lighting spokes 224 and areas 226.

2. LEDs 280 are intermittently illuminated in direct relationship to wheel speed whereby spokes 224 appear stationary.

3. LEDs 280 are intermittently illuminated to make spokes 224 appear stationary with periodic times of no illumination.

4. LEDs 280 are intermittently illuminated at a slower frequency than wheel speed which makes the spokes 224 appear to slowly rotate in a forward direction.

5. LEDs 280 are intermittently illuminated at a faster frequency than wheel speed which makes the spokes 224 appear to slowly rotate in a backward direction.

6. LEDs 280 flash when vehicle stops, but no flashing when vehicle is moving.

7. LEDs 280 flash sequentially with four LEDs flashing at once in a clockwise movement when vehicle is not moving.

Also, other programs may be used, and any one of programs 2–5 may be combined with either program 6 or 7.

FIG. 18 shows an alternate embodiment 320 of the invention similar to the system 220 shown in FIGS. 11–17, but differing slightly in that circuit board 272 also includes an array of spaced apart LEDs 280A arranged around the periphery of the board. LEDs 280A flash in unison with the LEDs 280 on board 270. Otherwise, the systems are the same. The two sets of LEDs could also flash independently.

FIG. 19 also shows an alternative system 330 similar in many respects to system 220 shown in FIGS. 11–17. Instead of a main housing element 234, system 330 includes a plate 332 in the central cavity 228 of wheel 222 secured in place by the lug nuts 232. A cup-shaped transparent lens housing 254A is secured to plate 332 by screws 334, and an opaque cap 244A covers the cup-shaped lens housing. The cap 244A has an inside bearing 290A for shaft 288. Otherwise the system 330 is the same as system 222 of FIGS. 11–17. Basically, system 330 has a window which extends 360° around the housing as opposed to the spaced apart windows 242 of system 220.

As noted above, the wheel lighting system has circuit boards using microprocessor technology attached to resistors and capacitors and LEDs and powered by batteries. The electronic components consisting of the resistors and capacitors work collectively to provide the correct voltage when energized by the batteries to provide light via the LEDs. The circuit boards are enclosed in an air-tight cavity preferably to negate the adverse effects of the environment. When energized the LEDs light at a pre-programmed frequency as the wheel is turning making the spokes of the wheel to appear stationary even as the wheel is moving at normal driving speeds, for example.

Specific LEDs light behind a plastic lens/covering which directs the lighting to the desired position on the wheel to give the desired stationary or animated motion effect depending on the frequency of the light burst relative to the rotation of the wheel. Other LEDs will illuminate indefinitely for as long as the unit remains on and will emit light on the inner lip of the diameter of the wheel. These LEDs will be positioned on the edge of the enclosed boards between the plastic lens/coverings.

We claim:

1. An illumination system for directing controlled flashes of light onto a vehicle wheel, the system including a housing constructed and arranged to rotate with a vehicle wheel, a cavity within the housing, substantially stationary lighting and control means therefor within the cavity, window means in the housing for directing light from the cavity onto a vehicle wheel, whereby the control means is constructed and arranged to flash the lighting at a desired frequency.

2. An illumination system for directing controlled flashes of light onto a vehicle wheel, the system including a housing, constructed and arranged to rotate with a vehicle wheel, a cavity within the housing, substantially stationary lighting means and substantially stationary control means therefor within the cavity, and window means in the housing for directing lighting from the lighting means within the cavity onto a vehicle wheel, whereby the control means is constructed and arranged to flash the lighting means at a frequency related to rotational speed of the wheel.

3. An illumination system as in claim 2 wherein the lighting means comprises ultraviolet radiation.

4. An illumination system as in claim 2 wherein the lighting means comprises infrared radiation.

5. An illumination system as in claim 2 wherein the window means extends 360° around the housing.

6. An illumination system as in claim 2 including a remote control connected to the control means constructed and arranged to energize and deenergize the system and to select and alter the frequency of flashing the lighting means.

7. An illumination system as in claim 2 in combination with a vehicle wheel.

8. An illumination system as in claim 7 wherein the vehicle wheel has spaced apart spokes with spaces therebetween.

9. An illumination system as in claim 8 wherein the window means in the housing open onto the spokes of the wheel and the spaces therebetween.

10. An illumination system as in claim 9 including spoke lenses above each spoke connected to the housing above the window means whereby light passes through the window means onto the spoke lenses.

11. An illumination system as in claim 9 wherein the lighting means comprises two spaced apart circular arrays of spaced apart LEDs.

12. An illumination system as in claim 9 wherein the lighting means comprises a circular array of spaced apart LEDs.

13. An illumination system as in claim 12 wherein the control means includes a battery and microprocessor.

14. An illumination system as in claim 9 including a magnet connected to rotate with the housing, and a magnetic sensor on the control means for the lighting means for determining the rotational speed of the vehicle wheel.

15. An illumination system as in claim 14 wherein the control means flashes the lighting means in direct relationship to the rotational speed of the vehicle wheel whereby the spokes and spaces therebetween appear stationary.

16. An illumination system as in claim 14 wherein the control means flashes the lighting means at a frequency higher than the rotational speed of the vehicle wheel whereby the spokes and spaces therebetween appear to slowly rotate backward.

17. An illumination system as in claim 14 wherein the control means flashes the lighting means at a frequency lower than the rotational speed of the vehicle wheel whereby the spokes and spaces therebetween appear to slowly rotate forward.

* * * * *